United States Patent

Zhang et al.

Patent Number: 6,108,471
Date of Patent: Aug. 22, 2000

[54] COMPACT DOUBLE-PASS WAVELENGTH MULTIPLEXER-DEMULTIPLEXER HAVING AN INCREASED NUMBER OF CHANNELS

[75] Inventors: Shu Zhang, Waterloo, Canada; Wei Yang, Fremont, Calif.

[73] Assignee: Bayspec, Inc., Fremont, Calif.

[21] Appl. No.: 09/362,926

[22] Filed: Jul. 27, 1999

Related U.S. Application Data

[63] Continuation of application No. 09/193,289, Nov. 17, 1998.

[51] Int. Cl.$^7$ .............................. G02B 6/34; H04J 14/02
[52] U.S. Cl. ................................ 385/37; 385/24; 385/33; 385/36; 359/129; 359/130
[58] Field of Search .................................. 385/24, 37, 14, 385/33, 34, 35, 31, 89, 36; 359/130, 128, 124, 129; 372/6, 96, 102

[56] References Cited

U.S. PATENT DOCUMENTS

| | | | |
|---|---|---|---|
| 4,111,524 | 9/1978 | Tomlinson, III | 350/96.19 |
| 4,153,330 | 5/1979 | Tomlinson, III | 350/96.17 |
| 4,198,117 | 4/1980 | Kobayashi | 350/96.19 |

(List continued on next page.)

OTHER PUBLICATIONS

Tomlinson, W.J., "Wavelength Multiplexing In Multimode Optical Fibers", *Applied Optics*, vol. 16, No. 8, pp. 2180–2194 (Aug. 1977).

Chang, B.J. et al., "Dichromated Gelatin For The Fabrication of Holographic Optical Element", *Applied Optics*, vol. 18, pp. 2407–2417 (1979).

Aoyama, K. et al., "Low–Loss Optical Demultiplexer For WDM Systems In The 0.8 $\mu$m Wavelength Region" *Applied Optics*, vol. 18, pp 2407–1417 (1979).

Ishii Y. et al., "Wavelength Demultiplexer In Multimode Fiber That Uses Optimized Holographic Elements", *Applied Optics*, vol. 32, No. 23, pp. 4415–4422 (1993).

Moslehi, et al., "Fiber–Optic Wavelength–Division Multiplexing And Demultiplexing Using Volume Holographic Gratings", *Optics Letters*, vol. 14, No. 19, pp. 1088–1090 (Oct. 1989).

Aoyama, K., et al., "Optical Demultiplexer For A Wavelength Division Multiplexing System", *Applied Optics*, vol. 18, No. 8, pp. 1253–1258 (Apr. 15, 1979).

Tomlinson, W.J., "Applications of GRIN–Rod Lenses In Optical Fiber Communication Systems", *Applied Optics*, vol. 19, No. 7, pp. 1127–1138 (Apr. 1, 1980).

(List continued on next page.)

*Primary Examiner*—Hemang Sanghavi
*Attorney, Agent, or Firm*—Claude A. S. Hamrick; Oppenheimer W. Donnelly; Justin F. Boyce

[57] ABSTRACT

An optical multiplexing and demultiplexing device includes: a plurality of optical fibers each terminating in a fiber end for radiating and receiving corresponding light beams; a fiber mounting assembly configured to support the optical fibers so that the fiber ends terminate in substantially the same plane, the mounting assembly also being configured to position the fibers in a regular array of N rows and M columns; reflecting means for reflecting beams radiating from the fiber ends; lens means for collimating and focusing beams propagating between the fiber ends and the reflecting means, the lens means having a focal length associated therewith; and diffraction means for diffracting beams propagating between the lens means and the reflecting means. The reflecting means includes a plurality of N reflective elements, each of the N reflective elements being associated with a corresponding one of the N rows. The array is substantially defined by a row axis that is substantially parallel to each of the rows and a column axis that is substantially parallel to each of the columns. Each of the reflective surfaces forms a corresponding first angle of rotation about a first line parallel to the row axis, and a corresponding second angle of rotation about a second line parallel to the column axis. The first angle of rotation of a corresponding one of the reflective surfaces is proportional to a distance measured between the center fiber and the row associated with corresponding reflective surface.

20 Claims, 3 Drawing Sheets

U.S. PATENT DOCUMENTS

| | | |
|---|---|---|
| 4,274,706 | 6/1981 | Tangonan ............................... 350/96.19 |
| 4,299,488 | 11/1981 | Tomlinson, III ........................ 356/328 |
| 4,337,993 | 7/1982 | Kompfner ................................. 385/37 |
| 4,359,259 | 11/1982 | Horner et al. ............................ 350/3.7 |
| 4,387,955 | 6/1983 | Ludman et al. ...................... 350/96.19 |
| 4,474,424 | 10/1984 | Wagner ..................................... 385/24 |
| 4,486,071 | 12/1984 | Levinson ................................... 385/37 |
| 4,552,462 | 11/1985 | Large et al. .......................... 350/96.19 |
| 4,583,820 | 4/1986 | Flamand et al. ........................... 385/37 |
| 4,622,662 | 11/1986 | Laude et al. ................................ 370/3 |
| 4,634,215 | 1/1987 | Reule ................................... 350/96.19 |
| 4,643,519 | 2/1987 | Bussard et al. ...................... 350/96.19 |
| 4,671,607 | 6/1987 | Laude ................................... 350/96.15 |
| 4,675,860 | 6/1987 | Laude et al. ................................ 370/3 |
| 4,703,472 | 10/1987 | Blumentritt et al. ....................... 370/3 |
| 4,708,425 | 11/1987 | Gouali et al. ........................ 350/96.16 |
| 4,726,645 | 2/1988 | Yamashita et al. .................. 350/96.18 |
| 4,740,951 | 4/1988 | Lizet et al. ................................. 370/3 |
| 4,741,588 | 5/1988 | Nicia et al. .......................... 350/96.19 |
| 4,744,618 | 5/1988 | Mahlein ............................... 350/96.19 |
| 4,746,186 | 5/1988 | Nicia ................................... 350/96.13 |
| 4,763,969 | 8/1988 | Khoe et al. .......................... 350/96.19 |
| 4,773,063 | 9/1988 | Hunsperger et al. ....................... 370/3 |
| 4,786,133 | 11/1988 | Gidon et al. ......................... 350/96.19 |
| 4,819,224 | 4/1989 | Laude et al. ................................ 370/3 |
| 4,819,244 | 4/1989 | Yamamoto et al. ....................... 372/46 |
| 4,836,634 | 6/1989 | Laude ................................... 350/96.19 |
| 4,923,271 | 5/1990 | Henry et al. ......................... 350/96.19 |
| 4,926,412 | 5/1990 | Jannson et al. ............................. 370/3 |
| 4,930,855 | 6/1990 | Clark et al. .......................... 350/96.19 |
| 4,934,784 | 6/1990 | Kapany et al. ............................ 385/37 |
| 5,026,131 | 6/1991 | Jannson et al. ........................... 350/3.7 |
| 5,107,359 | 4/1992 | Ohuchida ................................ 359/124 |
| 5,119,454 | 6/1992 | McMahon ................................. 385/49 |
| 5,305,402 | 4/1994 | Hill et al. ................................... 385/25 |
| 5,355,237 | 10/1994 | Lang et al. ............................... 359/130 |
| 5,363,220 | 11/1994 | Kuwayama et al. ........................ 359/3 |
| 5,371,813 | 12/1994 | Aartgue ..................................... 385/24 |
| 5,377,286 | 12/1994 | Iida et al. ................................... 385/37 |
| 5,440,416 | 8/1995 | Cohen et al. ............................ 359/127 |
| 5,442,472 | 8/1995 | Skrobko .................................. 359/110 |
| 5,450,510 | 9/1995 | Boord et al. ............................... 385/37 |
| 5,457,573 | 10/1995 | Iida et al. ................................. 359/569 |
| 5,500,910 | 3/1996 | Boudreau et al. ........................ 385/24 |
| 5,526,155 | 6/1996 | Knox et al. .............................. 359/130 |
| 5,555,334 | 9/1996 | Ohnishi et al. ............................ 385/93 |
| 5,583,683 | 12/1996 | Scobey .................................... 359/127 |
| 5,768,450 | 6/1998 | Bhagavatula ............................. 385/24 |
| 5,777,763 | 7/1998 | Tomlinson, III ........................ 359/130 |
| 5,835,517 | 11/1998 | Jayaraman et al. ........................ 372/50 |
| 5,917,625 | 6/1999 | Ogusu et al. .............................. 385/37 |
| 5,960,133 | 9/1999 | Tomlinson ................................. 385/37 |
| 5,999,672 | 12/1999 | Hunter et al. .............................. 385/37 |

OTHER PUBLICATIONS

Metcalf, B.D., et al., "High–Capacity Wavelength Demultiplexer With A Large–Diameter GRIN Rod Lens", *Applied Optics,*, vol. 21, No. 5, pp. 794–796 (Mar. 1, 1982).

Lipson, J., et al., "Low–Loss Wavelength Division Multiplexing (WDM) Devices For Single–Mode Systems", *Journal of Lightwave Technology,*, vol. LT–1, No. 2, pp. 387–389 (Jun. 1983).

Winzer, G., "Wavelength Multiplexing Components—A Review Of Single–Mode Devices And Their Applications", *Journal of Lightwave Technology*, vol. LT–2, No. 4, pp. 369–378 (Aug. 1984).

Fujii, Y., et al., "Optical Demultiplexer Utilizing An Ebert Mounting Silicon Grating", *Journal of Lightwave Technology*, vol. LT–2, No. 5, pp. 731–734 (Oct. 1984).

Ishio, H., et al., "Review And Status Of Wavelength–Division–Multiplexing Technology And Its Application", *Journal of Lightwave Technology,*, vol. LT–2, No. 4, pp. 448–463 (Aug. 1984).

Lipson, J., et al., "A Four–Channel Lightwave Subsystem Using Wavelength Division Multiplexing", *IEEE Journal of Lightwave Technology*, vol. LT–3, No. 1, pp. 16–20 (Feb. 1985).

Hillerich, B., et al., "Wide Passband Grating Multiplexer For Multimode Fibers", *Journal of Lightwave Technology*, vol. LT–3, No. 3, pp. 590–594 (Jun. 1985).

Lipson, J., et al., "A Six–Channel Wavelength Multiplexer And Demultiplexer For Single Modoe Systems", *Journal of Lightwave Technology*, vol. LT–3, No. 5, pp. 1159–1163 (Oct. 1985).

Nishi, I., et al., "Broad Passband Multi/Demultiplexer For Multimode Fibers Using A Diffraction Grating And Retroreflectors", *Journal Of Lightwave Technology*, vol. LT–5, No. 12, pp. 1695–1700 (Dec. 1987).

Huang, Y., et al., "Wavelength–Division–Multiplexing And – Demultiplexing Using Substrate–Mode Grating Pairs", *Optics Letters,*, vol. 17, No. 22, pp. 1629–1631 (Nov. 15, 1992).

Wu, M., et al., "Design Considerations For Rowland Circle Gratings Used In Photonic Integrated Devices For WDM Applications", *Journal of Lightwave Technology*, vol. 12, No. 11, pp. 1939–1942 (Nov. 1994).

Wang, M., et al., "Five–Channel Polymer Waveguide Wavelength Division Demultiplexer For The New Infrared", *IEEE Photonics Technology Letters*, vol. 3, No. 1, pp. 36–38 (Jan. 1991).

COMPACT DOUBLE-PASS WAVELENGTH MULTIPLEXER-DEMULTIPLEXER HAVING AN INCREASED NUMBER OF CHANNELS

CROSS-REFERENCE TO RELATED APPLICATIONS

Reference is made to and priority claimed from U.S. patent application Ser. No. 09/193,289, filed Nov. 17, 1998, entitled "COMPACT DOUBLE-PASS WAVELENGTH MULTIPLEXER-DEMULTIPLEXER." which is incorporated herein by reference.

BACKGROUND OF THE INVENTION

1. Field of the Invention

This invention relates generally to a method and apparatus for optical multiplexing and demultiplexing, and more specifically to a high resolution, wavelength selective optical multiplexer-demultiplexer device.

2. Description of the Prior Art

U.S. patent application Ser. No. 09/193,289, filed Nov. 17, 1998, entitled "COMPACT DOUBLE-PASS WAVELENGTH MULTIPLEXER-DEMULTIPLEXER." describes a multiplexing and demultiplexing device including: a fiber mounting assembly for aligning a plurality of optical fibers; a set of collimating and focusing optics; a transmission grating comprised of a holographic element; and a mirror element. In this device, the fiber mounting assembly assembles a series of substantially close-spaced optical fibers with their ends flushed in a substantially straight line. The set of collimating and focusing optics, transmission grating, and mirror are made and optimized for efficiently operating in preferred communication wavelength regions of the multiplexer/demultiplexer system.

When the described device operates as a demultiplexer, an optical beam containing a plurality of wavelengths is transmitted to the device by an input one of the optical fibers. The divergence of the beam depends on the numerical aperture of the input fiber whose end is located at the vicinity of the focal point of the collimating lens, the lens having a sufficient numerical aperture to accept the diverging beam from the optical fiber. The beam thus is substantially collimated by the lens and then impinged on the holographic element. A plurality of individual wavelengths within the beam are diffracted and angularly separated by the holographic element according to their wavelengths. The spatially separated beams are redirected by the mirror back to the holographic element which provides further spatial separation of the individual wavelengths, thus enhancing the total dispersion of the grating element. The spatially dispersed beams are focused by the aforementioned focusing lens system and received directly by a series of optical fibers.

The described device also operates as a multiplexer, essentially by reversing the beam directions as compared to the beam directions as the device operates in the demultiplexer mode. In the demultiplexer mode, optical beams with different wavelengths from the series of optical fibers are collected by the lens, and then diffracted by the holographic element with specific angular orientations according to the specific wavelength of the individual beam. The diffracted beams are reflected by the mirror, and diffracted again by the holographic element, which eventually merges the beams into a substantially collimated beam including all of the wavelengths. This collimated beam is condensed by the lens and is received by an output one of the optical fibers.

While the device described in U.S. patent application Ser. No. 09/193,289 overcomes the major drawbacks of prior art devices and satisfies several critical requirements, such as providing dense wavelength division multiplexing (DWDM), the device has certain limitations when it is used to handle a large number of channels (e.g., 80 channels). In order to increase the capacity of fiber communication networks, the number of channels can be increased by decreasing channel spacing. For example, for covering a fiber transmitting window of approximately 1540 nm, a 100 GHz (0.8 nm) spacing will generate about 40 channels. Using a 200 GHz (0.4 nm) spacing allows for 80 channels. Moreover, recent advances in fiber-amplification technologies provide for doubling the wavelength range of the fiber transmitting window of approximately 1540 nm, which makes it possible to increase the number of available channels to well over 100 in a nominal spacing. See "Ultrawide 75-nm 3-db Gain-Band Optical Amplification with Erbium-doped Fluoride Fiber Amplifiers and Distributed Raman Amplifiers", IEEE Photonic Technology Letters, Vol. 10, No. 4, April, 1998, by Hiroji Masuda et al.

For the device described in U.S. patent application Ser. No. 09/193,289, because the fiber mounting assembly aligns the optical fibers in a substantially straight line, the end-to-end length of this line of fiber increases as the number of channels increases. Consequently, the optical aperture, and the over-all size of the device must be increased accordingly for two reasons described below.

First, the optical beams closer to the ends of the aforementioned straight line of fibers have an optical axis which diverges from the main optical axis of the device. To avoid the block-out of these beams, the numerical aperture of the collimating and focusing lens must be larger than that of the aforementioned optical fibers by at least a factor of $\Delta/f$, where $\Delta$ is the distance from the center fiber and end fiber and of the focusing length of the lens. For example, 80 channels of $50/125$ multi-mode optical fibers will extend to 5 mm on both sides of the center if arranged in a straight line. For a focusing length with 50 mm focal length, the required numerical aperture of the lens will be at least 0.1 larger than that of the optical fiber. Assuming the focusing length of the lens is fixed, as is normally the case, this increase in the numerical aperture translates into an increase in the diameter of the lens, and therefore an increase in the active area of the transmission grating, the mirror, and the over-all size of the device.

Second, the more the optical beam diverges from the main optical axis of the device, the more likely it suffers optical aberrations. As the number of channel increases, the optical aberrations become significant for the channels closer to the ends. Potential methods for eliminating this off-axis effect include: (1) using a specially designed lens to correct the optical aberrations; and (2) increasing the diameter of the lens (e.g., increase the diameter of the lens to ten times the length of the line of fiber ends). However, these methods are not feasible because a specially designed lens is difficult to manufacture, while increasing the diameter of the lens increases the over-all size of the device. An increase in the size of the aforementioned device will not only lead to increased costs of production, but also make the environmental (thermal, stress etc.) responses of the mechanical and optical assembly of the device hard to control.

SUMMARY OF THE INVENTION

It is an object of the present invention to provide methods and apparatus for overcoming the aforementioned drawbacks and for producing a dense wavelength division multiplexing device that accommodates a large number of channels while it is still small, lightweight, immune to temperature variation and stress-induced instability, and inexpensive to produce.

It is yet another object of the present invention to provide methods and apparatus for a dense wavelength division multiplexing device that is easy to manufacture in large quantities, using the components that are easy to make and assemble.

Briefly, a presently preferred embodiment of the present invention provides an optical multiplexing and demultiplexing device including: a plurality of optical fibers each terminating in a fiber end for radiating and receiving corresponding light beams; a fiber mounting assembly configured to support the optical fibers so that the fiber ends terminate in substantially the same plane, the mounting assembly also being configured to position the fibers in a regular array of N rows and M columns; reflecting means for reflecting beams radiating from the fiber ends; lens means for collimating and focusing beams propagating between the fiber ends and the reflecting means, the lens means having a focal length associated therewith; and diffraction means for diffracting beams propagating between the lens means and the reflecting means.

The device is operable in a demultiplexing mode wherein a fiber end of a demultiplexer input one of the fibers radiates a multi-channel beam including a plurality of wavelengths toward the reflecting means via the lens means and the diffraction means, the multi-channel beam being diffracted and angularly separated according to the wavelengths into a plurality of spatially dispersed single channel beams which are directed back to fiber ends of corresponding ones of a plurality of demultiplexer output ones of the fibers. The device is also operable in a multiplexing mode wherein each fiber end of a plurality of multiplexer input ones of the fibers radiates a corresponding single channel beam including a corresponding single wavelength toward the reflecting means via the lens means and the diffraction means, the single channel beams being collected, diffracted, and merged into a substantially collimated multi-channel beam including each of the single wavelengths, the collimated multi-channel beam being condensed by the lens means and directed back to an end of a multiplexer output one of the fibers.

In an embodiment, the reflecting means comprises a plurality of N reflective elements, each of the N reflective elements being associated with a corresponding one of the N rows. The array is substantially defined by a row axis that is substantially parallel to each of the rows and a column axis that is substantially parallel to each of the columns. Each of the reflective surfaces forms a corresponding first angle of rotation about a first line parallel to the row axis, and a corresponding second angle of rotation about a second line parallel to the column axis. The first angle of rotation of a corresponding one of the reflective surfaces is proportional to a distance measured between the center fiber and the row associated with corresponding reflective surface. The diffraction means includes a grating having a grating orientation angle, and the second angle of rotation of a corresponding one of the reflective surfaces is proportional to the grating orientation angle.

An important advantage of the present invention is that it provides a dense wavelength division multiplexing device that accommodates a large number of channels.

Other advantages of the multiplexing device of the present invention is that it is small, lightweight, immune to temperature variation and stress-induced instability, and inexpensive to produce.

The foregoing and other objects, features, and advantages of the present invention will be apparent from the following detailed description of the preferred embodiment which makes reference to the several figures of the drawing.

IN THE DRAWINGS

DETAILED DESCRIPTION OF THE PREFERRED EMBODIMENTS

Figure 1:
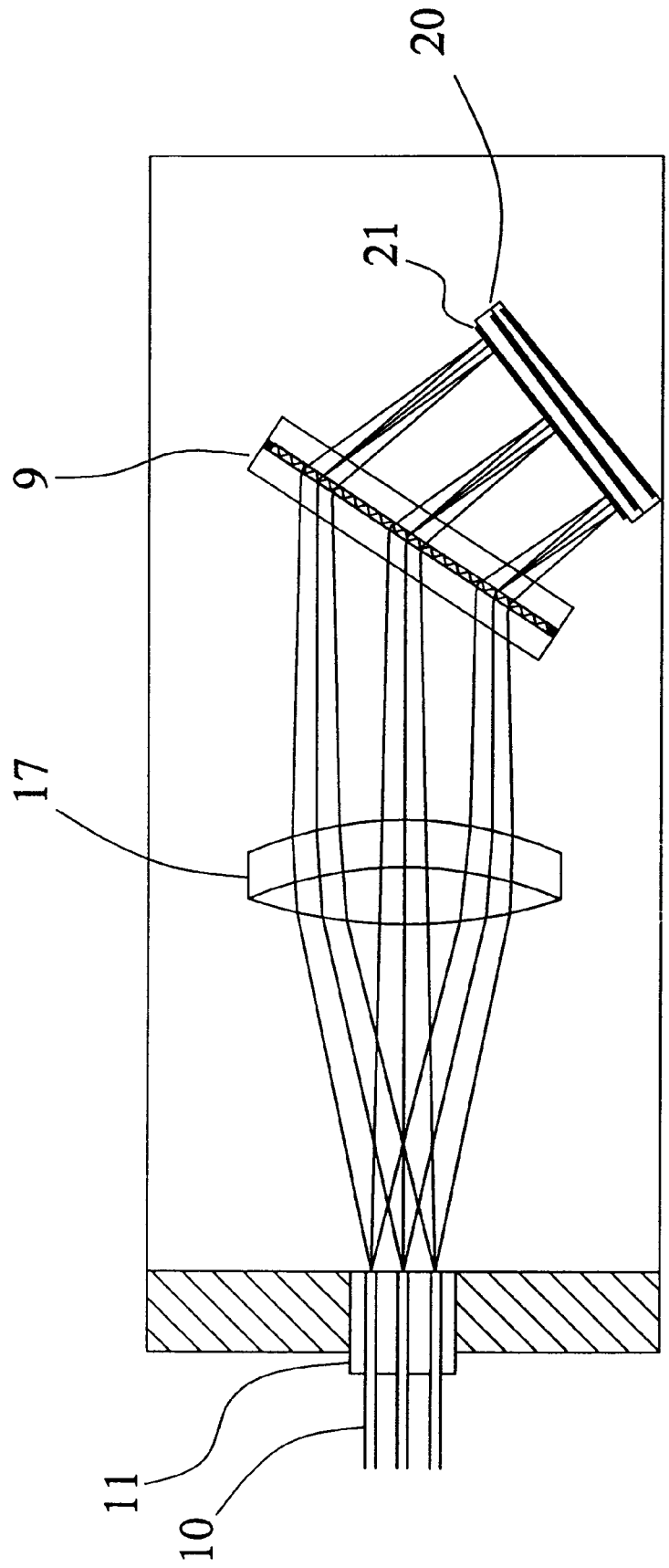
FIG. 1 is a diagram illustrating an optical multiplexer-demultiplexer device in accordance with the present invention.

FIG. 1 shows a diagram generally illustrating an optical multiplexer-demultiplexer device in accordance with the present invention. An optical multiplexer-demultiplexer device in accordance with the present invention operates in the same general manner as the device described in FIG. 1 U.S. patent application Ser. No. 09/193,289, filed Nov. 17, 1998, entitled "COMPACT DOUBLE-PASS WAVELENGTH MULTIPLEXER-DEMULTIPLEXER." which is incorporated herein by reference.

When the depicted device operates as a demultiplexer, an optical beam containing a plurality of wavelengths is transmitted to the device by one of the optical fibers 10, the end of which is located at the vicinity of a focal point of a collimating lens 17. The beam having mixed wavelengths thus is substantially collimated by the lens 17 and then impinged on a grating assembly 9 having a holographic element, which diffracts and angularly separates the beam into a number of individual collimated beams according to the number of wavelengths containing in the mixed beam. The spatially separated beams will be redirected by the reflective element 20 back to the holographic element of the grating assembly 9, which provides further spatial separation of the individual wavelengths. The spatially dispersed collimated beams are focused by the focusing lens 17 and received directly by a series of optical fibers 10. By reversing the beam directions, as when the device operates in the multiplexer mode, the individual collimated beams are merged into a collimated beam by the holographic element of the grating assembly 9. This collimated beam is condensed by the lens 17 and is received by one of the optical fibers 10.

Despite of the similarity, however, the fiber assembly 11 and the reflective element 20 of the present invention are constructed preferable differently so that the device has the capability to handle a much larger number of channels without introducing the aforementioned drawbacks.

Figure 2:
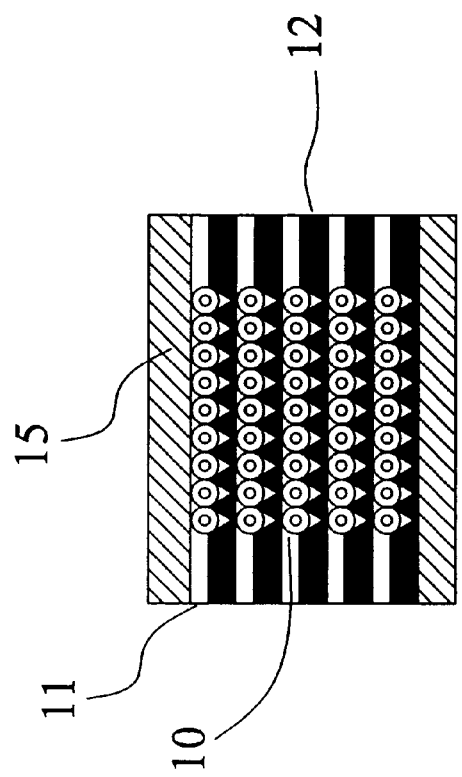
FIG. 2 is a diagram showing a V-groove fiber assembly.

FIG. 2 shows a diagram of a first embodiment of the fiber mounting assembly 11 formed by stacking one or more rows of substantially close-spaced, end-fused AR (anti-reflection) coated optical fibers 10, preferably well aligned in, but not limited to, silicon V-grooves 12. The optical fibers 10 are either multi-mode or single mode communication fibers which are capable of transmitting optical radiation with substantially high transmittance, preferably in wavelength ranges most suitable for fiber optic networks, that is wavelength ranges having low loss and high amplification. For example, the wavelength range could be, but is not limited to, a wavelength band ranging from approximately 1230 nm to 1560 nm for erbium-doped fiber amplifiers ("EDFAs"). The optical fibers 10 are so arranged that they form an N by M matrix of fibers, and thus achieve a smaller extent dimension. For example, a 64-channel fiber assembly with 50/125 multimode optical fiber can be just about 1 mm in size, while it could be over 8 mm if the fibers are arranged in a straight line. Note that the distance between the rows of fiber, or more precisely the distance of the fiber rows to the center of the assembly 11, is determined in conjunction with the tilt angle of the reflective elements, which will be formulized hereafter.

Figure 3:
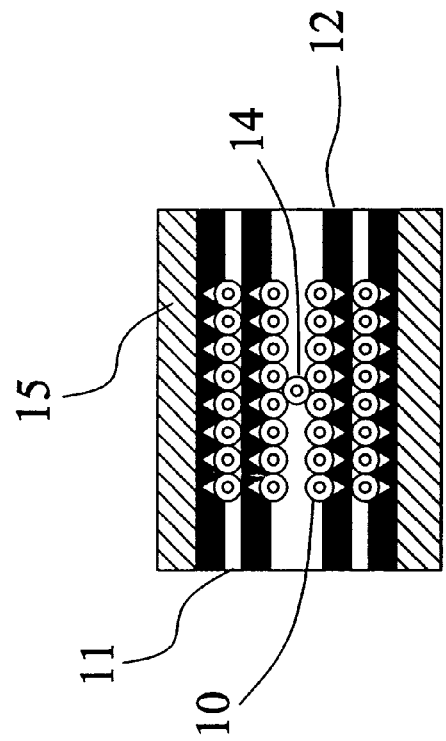
FIG. 3 is a diagram showing a alternative V-groove fiber assembly.

FIG. 3 illustrates a second embodiment of the fiber mounting assembly 11 formed by arranging the fibers, where one fiber 14 is arranged in the center of the fiber assembly 11, serving as the fiber for carrying the optical signal with mixed wavelengths. On both sides of the center fiber, arranged in parallel, are one or more rows of substantially close-spaced, end-fused and AR coated optical fibers 10, preferable seated in, but not limited to, silicon V-grooves 12.

In each of the first and second embodiments of the fiber mounting assembly 11, the fiber assembly 11 is clipped and sealed by two pieces of mounting metal 15 to provide mechanical strength and environmental stability for the fiber assembly.

Referring back to FIG. 1, the collimating lens system 17 and the grating assembly 9 are constructed and arranged in the way detailed in the pending U.S. patent application entitled "Compact Double-pass Wavelength multiplexer-demultiplexer", Ser. No. 09/193,289. The aforementioned pending U.S. patent application also gives a detailed description on all the preferable optical characteristics and the fabrication methods of these two elements. Note that the formulas for calculating the preferable distances between the lens 17 and the grating assembly 9 and between the grating assembly 9 and the reflective element 20 still hold for the present invention.

Still referring to FIG. 1, the reflective element 20 consists of a number of reflective surfaces, the number of reflective surfaces matching with the number of rows of optical fibers in the fiber assembly 11. Each of the surfaces is covered by a coating 21 that is highly reflective to a certain wavelength band and highly transparent to others. The reflective elements can be made preferably, but not limited to, by using one or more wedge-shaped optical components. These wedge-shaped optical components are made from the same type of optical glasses (such as BK7 optical glass), and can be air spaced or adhesively attached together to form the reflective element.

Figure 4:
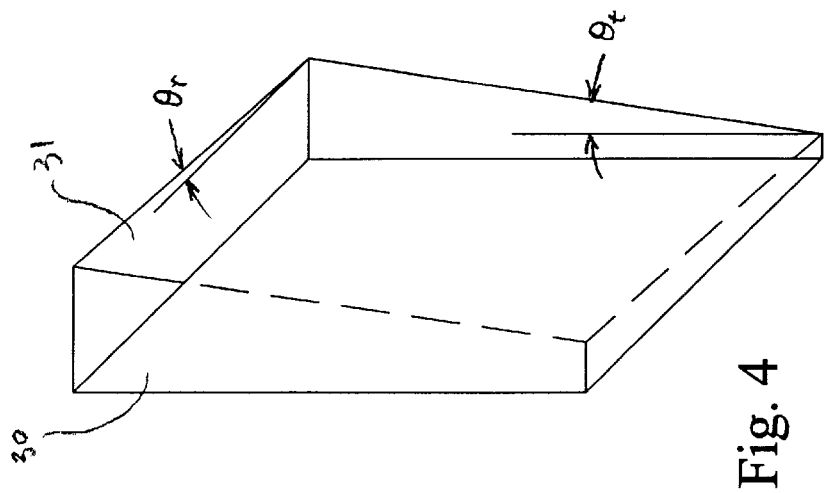
FIG. 4 is a diagram showing an example of an optical wedge with two reflective surfaces.

FIG. 4 shows an example of such a reflective element, which consists of one optical wedge with two reflective surfaces. The reflective wavelength bandwidth of the aforementioned surfaces is determined by the channel spacing and the number of channels on each row of the optical fibers. For example, for a row of eight channels with 0.8 nm channel spacing, the bandwidth is 6.4 nm. Note that the requirement for the cut-off edge of the wavelength band of each surface is much less restrictive than that of filter-based WDM devices because of the wider bandwidth. Current coating technology provides a very high cut-off accuracy for the concerned wavelength.

When the spatially separated beams from the grating assembly 9 reach the reflective element 20, each reflective surface reflects the beams within a certain wavelength band to a predetermined direction. After passing through the grating assembly 9 again, the beams in different wavelength bands are focused onto different ones of the rows of the fibers by the focusing lens 17.

Referring to the example of the optical wedge of FIG. 4, it will be noted that in general, a reflective surface 31 can be well defined by a pair of angles, namely the rotating angle $\theta_r$ and the tilting angle $\theta_t$. These angles are measured with respect to the nominal surface 30, and can be determined with the grating parameters, the central wavelength of the coating, the focal length of the lens, and the position of the targeted fiber row.

Figure 5:
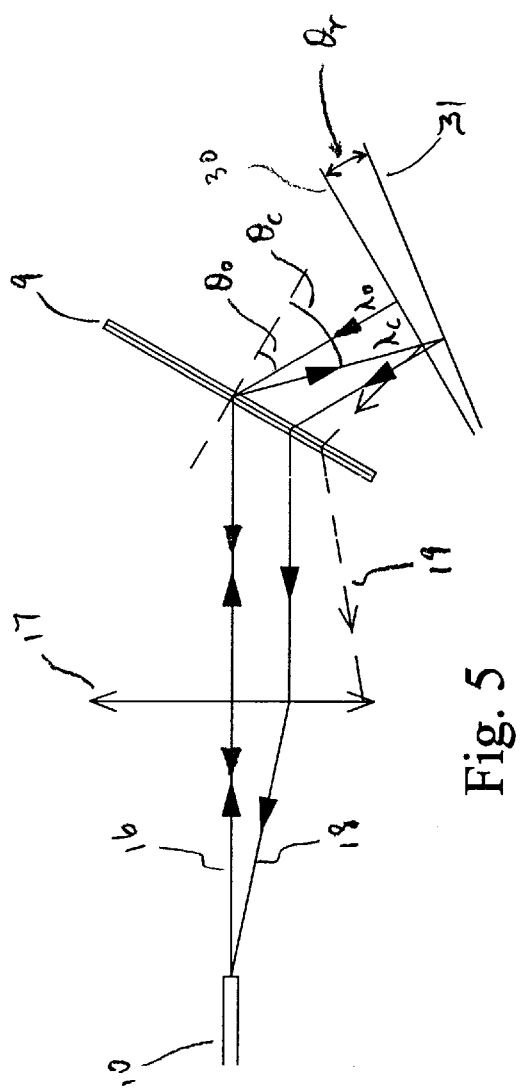
FIG. 5 is a diagram showing the relation between optical components.
Figure 6:
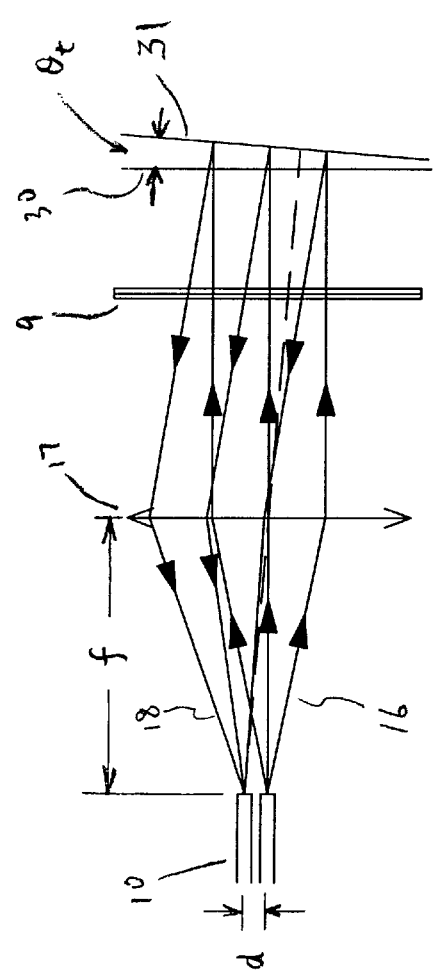
FIG. 6 is a schematic showing the relation between optical components from another angle of view.

Referring to the schematic in FIG. 5, which illustrates an abstract top view of the device, and FIG. 6 which illustrates an abstract side view of the device, the reflective surfaces 30 and 31 are coated and optimized to reflect wavelength bands centered at $\lambda_0$ and $\lambda_c$ respectively. $\lambda_c$ is the central wavelength of the reflective coating on the surface.

After the optical beam 16 with mixed wavelengths from the center fiber of the fiber assembly 10 is dispersed by the grating element 9, the wavelength band centered at $\lambda_0$ is reflected by the surface 30 and returned and received by the center row of the fibers, while the wavelength band centered at $\lambda_c$ passes through the surface 30 and is reflected by the surface 31. The surface 31 redirects the beams 18 of $\lambda_c$ so that they are parallel to the beams of $\lambda_0$ (as shown in FIG. 5). Thus the beams of 18 of $\lambda_c$ are also focused onto the central range of the fiber assembly (as shown in FIG. 5), but received by the row of fibers above the center row by a distance d (as shown in FIG. 6). It is noted on FIG. 5 that if the surface 30 reflects all wavelengths as it is in the aforementioned pending U.S. patent, the beams of $\lambda_c$ will follow the path of beam 19. In such a case, a larger aperture of the lens 17 will be required, or the beam will be blocked out.

Referring still to FIGS. 5 and 6, $\theta_0$ denotes the refracting angle of $\lambda_0$, which is also equal to the grating orientation angle. The focal length of the lens 17 is denoted by "f". Equations (1) and (2), below, define relationships for the rotating angle $\theta_r$ and the tilting angle $\theta_t$:

$$\theta_r = [\sin^{-1}(\sin\theta_0 - \lambda/p) - \theta_0]/2 \quad (1)$$

$$\theta_t = \tan^{-1}(d/f) \quad (2)$$

where p the period of the grating, and d is the distance between the target row and the center of the fiber assembly. It will be noted that once these angles are determined, the optical wedge may be easily made.

In summary, the present invention overcomes the drawbacks of prior art technologies and provides an improved DWDM method and apparatus. The invention provides a multiplexer-demultiplexer device for fiber optic communication networks, in particular, a DWDM system with low insertion loss, low inter-channel cross-talk, low polarization sensitivity and a capability to handle a large number of channels. The device is small, lightweight, immune to temperature variation and stress-induced instability, and inexpensive to produce.

Although the present invention has been described in terms of specific embodiments, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. An optical multiplexing and demultiplexing device comprising:

a plurality of optical fibers each terminating in a fiber end for radiating and receiving associated light beams;

a fiber mounting assembly configured to support said optical fibers so that said fiber ends terminate in substantially the same plane, said mounting assembly also being configured to position said fiber ends in at least one array including a plurality of rows of said fiber ends, each fiber end of an associated one of said rows for radiating and receiving beams within an associated predetermined wavelength band;

reflecting means for reflecting beams radiating from said fiber ends;

lens means for collimating and focusing beams propagating between said fiber ends and said reflecting means, said lens means having a focal length associated therewith; and transmissive diffraction means for diffracting beams propagating between said lens means and said reflecting means;

said reflecting means including a plurality of reflective surfaces each being associated with one of said rows of fiber ends, and being reflective to the predetermined wavelength band associated with said associated row, and being oriented to reflect beams to and from fiber ends of said associated row via said diffraction means and said lens means.

2. An optical multiplexing and demultiplexing device as recited in claim 1 wherein said array of said fiber ends supported by said fiber mounting assembly comprises a regular array of N rows and M columns.

3. An optical multiplexing and demultiplexing device as recited in claim 2 wherein said array is substantially defined by a row axis that is substantially parallel to each of said rows and a column axis that is substantially parallel to each of said columns, and wherein each of said reflective surfaces is oriented at a corresponding first angle of rotation about a first axis parallel to said row axis, and a corresponding second angle of rotation about a second axis parallel to said column axis.

4. An optical multiplexing and demultiplexing device as recited in claim 3 wherein said first angle of rotation of a particular one of said reflective surfaces is proportional to a distance measured between a center point of said array and the row associated with said particular reflective surface.

5. An optical multiplexing and demultiplexing device as recited in claim 4 wherein said diffraction means includes a grating having a grating orientation angle, and wherein said second angle of rotation of a corresponding one of said reflective surfaces is proportional to said grating orientation angle.

6. An optical multiplexing and demultiplexing device as recited in claim 1 wherein said at least one array of said fiber ends supported by said fiber mounting assembly comprises a first regular matrix including a first set of said fiber ends, a second regular matrix including a second set of said fiber ends, and a center fiber end separating said first and second regular matrices, said center fiber end terminating a center one of said optical fibers, said center fiber providing a demultiplexer input while said device operates in a demultiplexing mode, and providing a multiplexer output while said device operates in a multiplexing mode.

7. An optical multiplexing and demultiplexing device as recited in claim 6 wherein:

said device is operative in a demultiplexing mode wherein said center fiber radiates a multi-channel beam including a plurality of wavelengths toward said reflecting means via said lens means and said diffraction means, said multi-channel beam being diffracted and angularly separated by said diffraction means according to said wavelengths into a plurality of spatially dispersed single channel beams which are directed back to associated ones of a plurality of output ones of said fiber ends, each of said reflective surfaces being oriented to reflect beams received from said center fiber end to output fiber ends of said associated row; and said device is also operative in a multiplexing mode wherein each of a plurality of input ones of said fibers radiates an associated single channel beam including an associated single wavelength toward said reflecting means via said lens means and said diffraction means, said single channel beams being collected, diffracted, and merged into a substantially collimated multi-channel beam including each of said single wavelengths, said collimated multi-channel beam being condensed by said lens means and directed back to said center fiber, each of said reflective surfaces being oriented to reflect beams received from input fiber ends of said associated row to said center fiber.

8. An optical multiplexing and demultiplexing device as recited in claim 1 wherein said device is operative in a demultiplexing mode wherein an input one of said fiber ends radiates a multi-channel beam including a plurality of wavelengths toward said reflecting means via said lens means and said diffraction means, said multi-channel beam being diffracted and angularly separated by said diffraction means according to said wavelengths into a plurality of spatially dispersed single channel beams which are directed back to associated ones of a plurality of output ones of said fiber ends, each of said reflective surfaces being oriented to reflect beams received from said input fiber end to output fiber ends of said associated row.

9. An optical multiplexing and demultiplexing device as recited in claim 1 wherein said device is operative in a multiplexing mode wherein each of a plurality of input ones of said fibers radiates an associated single channel beam including an associated single wavelength toward said reflecting means via said lens means and said diffraction means, said single channel beams being collected, diffracted, and merged into a substantially collimated multi-channel beam including each of said single wavelengths, said collimated multi-channel beam being condensed by said lens means and directed back to an output one of said fibers, each of said reflective surfaces being oriented to reflect beams received from the input fiber ends of said associated row to said output fiber end.

10. An optical multiplexing and demultiplexing device as recited in claim 1 wherein a first and a second one of said reflective surfaces are positioned adjacent one another, and wherein said first and second reflective surfaces have corresponding first and second coatings formed thereon, said first coating being highly reflective to a first band of wavelengths, and being substantially transparent to a second band of wavelengths, said second coating being highly reflective to said second band of wavelengths.

11. An optical multiplexing and demultiplexing device as recited in claim 1 wherein said reflecting means comprises at least one wedge shaped object formed of optical glass, said object including a first major surface forming a first one of said reflective surfaces, and a second major surface forming a second one of said reflective surfaces.

12. An optical multiplexing and demultiplexing device as recited in claim 11 wherein at least one of said first and second major reflective surfaces has a coating disposed thereon, said coating being substantially reflective to a first band of wavelengths, and being substantially transparent to a second band of wavelengths.

13. An optical multiplexing and demultiplexing device as recited in claim 11 wherein said first major reflective surface has a first coating disposed thereon, said first coating being substantially reflective to a first band of wavelengths, and being substantially transparent to a second band of wavelengths.

14. An optical multiplexing and demultiplexing device as recited in claim 13 wherein said second major surface has a second coating disposed thereon, said second coating being substantially reflective to said second band of wavelengths.

15. An optical multiplexing and demultiplexing device as recited in claim 11 wherein said reflecting means comprises a plurality of said objects, and wherein each of said objects is adhesively attached to an adjacent one of said objects.

16. An optical multiplexing and demultiplexing device as recited in claim 11 wherein said reflecting means comprises a plurality of said objects, and wherein each of said objects is spaced apart from an adjacent one of said objects by air.

17. An optical multiplexing and demultiplexing device as recited in claim 11 wherein said first reflective surface has a first coating disposed thereon, and said second reflective surface has a second coating disposed thereon, said first and second coatings providing substantially optimal reflection of a first wavelength band and a second wavelength band respectively, said first and a second wavelength bands being centered respectively at a first wavelength and a second wavelength, and wherein a selected one of said angles formed between said first and second reflective surfaces is formed so that a first light beam having said first wavelength and a second light beam having said second wavelength are reflected respectively by said first and second reflective surfaces so that the first and second reflected beams are substantially parallel.

18. An optical multiplexing and demultiplexing device comprising:

a plurality of optical fibers each terminating in a fiber end for radiating and receiving corresponding light beams;

a fiber mounting assembly configured to support said optical fibers so that said fiber ends terminate in substantially the same plane, said mounting assembly also being configured to position said fiber ends in a regular array of N rows and M columns, each fiber end of an associated one of said rows for radiating and receiving beams within an associated predetermined wavelength band;

reflecting means for reflecting beams radiating from said fiber ends;

lens means for collimating and focusing beams propagating between said fiber ends and said reflecting means, said lens means having a focal length associated therewith; and transmissive diffraction means for diffracting beams propagating between said lens means and said reflecting means;

said reflecting means including a plurality of reflective surfaces each being associated with one of said rows of fiber ends, and being reflective to the predetermined wavelength band associated with said associated row, and being substantially transparent to wavelengths outside of said predetermined wavelength band, and being oriented to reflect beams to and from fiber ends of said associated row via said diffraction means and said lens means.

19. An optical multiplexing and demultiplexing device as recited in claim 18 wherein said reflecting means comprises a plurality of N reflective surfaces, each of said N reflective surfaces being associated with a corresponding one of said N rows.

20. An optical multiplexing and demultiplexing device as recited in claim 19 wherein:

said array is substantially defined by a row axis that is substantially parallel to each of said rows and a column axis that is substantially parallel to each of said columns, and wherein each of said reflective surfaces is oriented at a corresponding first angle of rotation about a first line parallel to said row axis, and a corresponding second angle of rotation about a second line parallel to said column axis; and said first angle of rotation of a particular one of said reflective surfaces is proportional to a distance measured between a center point of said array and said row associated with said particular reflective surface.

* * * * *